S. GRIFFITH & J. S. PATTERSON.

Assignors of one-third interest to L. DEVENNY.

Draft Apparatus for Railroad Cars.

No. 8,081. Reissued Feb. 12, 1878.

*Attest.*

*Geo. A. Vaillant*

*F. E. Harding*

*Inventor.*

*Samuel Griffith*

*John S. Patterson.*

*by Wm. M. Ramsey*

*Atty.*

N. PETERS, PHOTO-LITHOGRAPHER, WASHINGTON, D. C.

UNITED STATES PATENT OFFICE.

SAMUEL GRIFFITH AND JOHN S. PATTERSON, OF CINCINNATI, OHIO, ASSIGNORS OF ONE-THIRD INTEREST TO LAFAYETTE DEVENNY.

IMPROVEMENT IN DRAFT APPARATUS FOR RAILROAD-CARS.

Specification forming part of Letters Patent No. 167,333, dated August 31, 1875; Reissue No. 8,081, dated February 12, 1878; application filed June 8, 1877.

*To all whom it may concern:*

Be it known that we, SAMUEL GRIFFITH and JOHN S. PATTERSON, both of Cincinnati, in the county of Hamilton and State of Ohio, have invented certain new and useful Improvements in Draft Apparatus for Railroad-Cars, of which the following is a specification:

Our invention relates to railroad-cars in which the draw-bar and bumpers are connected in such manner that the bar by which the car is drawn extends entirely through the car and connects with the bumper or draw-heads on each end, between the ends of which draw-heads and the car-frame springs are interposed, so that in the operation of pulling the car the strain is applied to the compression of the rear spring, and the frame of the car is thus relieved from tensile strain, while in the act of bumping each spring is adapted to be compressed at the end at which the shock is received without producing any shock upon the other.

Our improvements consist in a novel mode of connecting the draw-bar and draw-heads, and in combining the same with draft and bumping springs, all being so disposed with relation to the frame as to transmit only strains of compression to the latter, as hereinafter more fully set forth.

Figure 1:
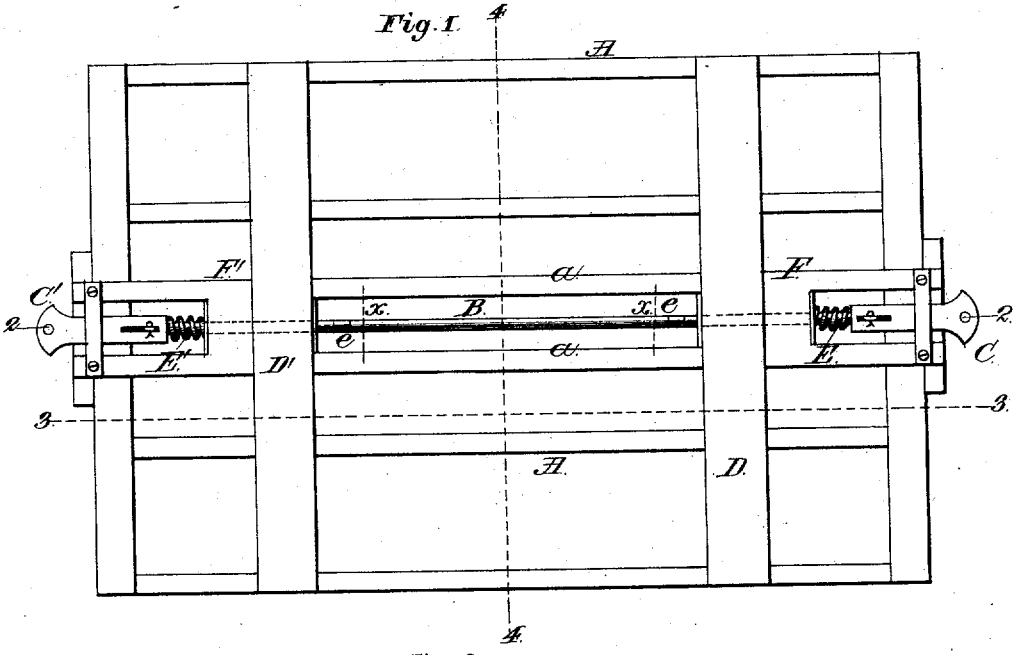
Figure 2:
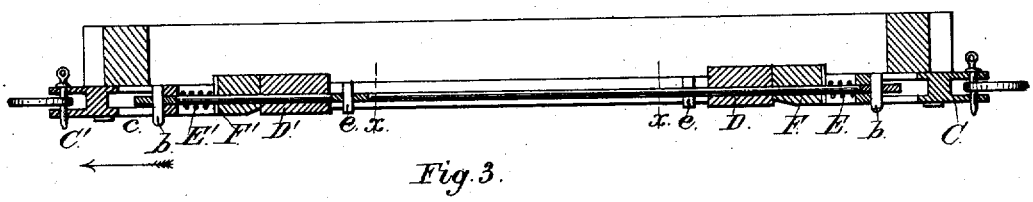
Figure 3:
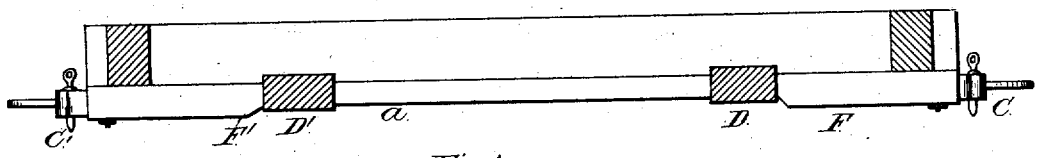
Figure 4:
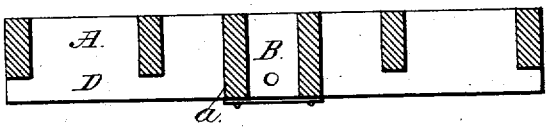
Figure 5:
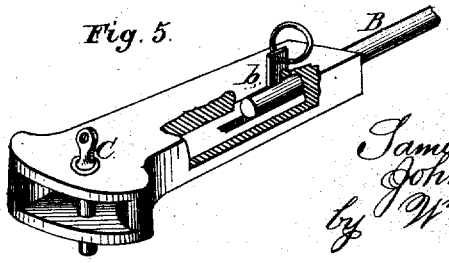

In the accompanying drawings, Figure 1 is a plan view of a lower side of a car-frame with our improvements applied; Fig. 2, a vertical longitudinal section of the same at the line 2 2 of Fig. 1; Fig. 3, a similar section at the line 3 3; Fig. 4, a vertical transverse section at the line 4 4; and Fig. 5, a view, in perspective, of one of the draw-heads, with a portion of the draw-bar.

The car-frame A is of the ordinary rectangular form, with transverse bolsters D D′, to the centers of which the trucks which support the car may be connected by means of the ordinary center-castings and drop center-pins or king-bolts. A rigid draw bar or rod, B, extends the entire distance between the end sills of the frame, and has no positive connection with the frame. Sliding draw-heads C C′ are fitted loosely upon the ends of the draw-bar B, being connected thereto by keys *b*, which are driven through the draw-bar, and serve to transmit the strain of draft to the car-frame, a limited range of longitudinal motion of the draw-heads upon the bar being provided for by slots *c* in the draw-heads, through which slots the keys *b* are introduced. This mode of connecting the draw-bar and draw-heads enables a single bar of uniform diameter or transverse area to be employed, and obviates the necessity of swelling or upsetting either of its ends, or using a screw and nut, thus correspondingly simplifying its construction. The outer ends of the draw-heads may be provided with any suitable coupling devices.

The strains of pulling and buffing are transmitted from the draw-heads to the car-frame by springs E E′, the outer ends of which bear, respectively, against the draw-heads C C, and their inner ends against fixed blocks F F′ firmly secured to the two center sills of the frame and bearing directly against the bolsters D D′ in line with the draw-bar B. For the purpose of causing each frame-bolster to sustain, as far as practicable, an equal share of strain, without unduly weakening the longitudinal sills by dividing or recessing them, we provide extra sills *d d*, extending from one bolster to the other, adjacent to the draw-bar and in line therewith, so as to transmit the strain in a direct line from the bolster D to the bolster D′, or vice versa.

The weight of the draw-bar B may be reduced, if desired, by making the portion thereof between the lines *x x* of less transverse area than the section of the bar at the keys *b*, so that the point at which breakage will occur, if at all, will be between the lines *x x*. In case of such reduction of area, keys *e* must be inserted, to prevent the end of the bar from being drawn out, if broken.

In the operation of our improvements, the strains applied to the draw-bar are tensile only, and those applied to the car-frame compressive only, and no strain other than that due to weight of the car and its load is imparted to the frame, the tractive force of the engine being applied to the cars following in the train through the draw-bars of the leading cars, and not through their frames. For example, in hauling the car in the direction of the arrow, Fig. 2, the strain of draft is tensile upon the draw-bar, and is applied compressively at the rear end of the car, through the spring E, to the fixed block F and bolster D, and transmitted to the bolster D′ by the extra sills *d d* in the line of draft. In the act of bumping, the spring at the end of the car receiving the concussion is acted directly upon by its adjacent draw-head, the slots *c* of which permit it to slide freely upon the draw-rod, without moving the same or exerting any pressure upon it, so that there is no compressive strain applied to the draw-bar under any circumstances.

We are aware that continuous draw-bars, provided with draft and buffing springs have been in use upon railroads from an early period, and are further aware that combinations of a draw-bar, heads, and springs, differing, however, in essential particulars from our invention, have been heretofore patented. We do not, therefore, claim said devices, or either of them.

We claim as our invention and desire to secure by Letters Patent—

1. The combination, with a railroad-car frame, of a rigid draw-bar and two draw-heads, each sliding upon one end of said bar, the draw-heads being connected to the bar, and their range of motion thereon regulated by keys driven through the bar and passing freely through longitudinal slots in the draw-heads, substantially as set forth.

2. The combination, substantially as specified, with a railroad-car frame, of a continuous draw-bar, two draw-heads respectively connected to opposite ends of said draw-bar by keys passing through longitudinal slots in the draw-heads, and safety-keys inserted in the draw-bar, behind the bolsters.

3. The combination, with a railroad-car frame, of a continuous draw-bar, draw-heads sliding thereon and bearing against springs, by which compressive strain is applied to the frame-bolsters and extra sills extending from one bolster to the other in the horizontal plane of the continuous draw-bar, substantially as set forth.

4. The combination, with a railroad-car frame, of a continuous draw-bar, a draw-head sliding on each end of said bar, and draft and buffing springs, which bear at one end against the sliding draw-heads, and at the other against fixed blocks surrounding the draw-bar and interposed between the springs and frame-bolsters in the line of draft, substantially as set forth.

5. The combination, with the car-frame, of the continuous draw-bar and its draw-head keys, the slotted draw-heads, the draft and buffing springs, the fixed blocks, and the extra sills, these members being arranged for joint operation, substantially as set forth.

S. GRIFFITH.
JOHN S. PATTERSON.

Witnesses:
GEO. F. SCHWEIN, Jr.,
BENJ. F. EHRMAN.